(12) United States Patent
Kwon et al.

(10) Patent No.: US 11,675,973 B2
(45) Date of Patent: Jun. 13, 2023

(54) ELECTRONIC DEVICE AND OPERATION METHOD FOR EMBEDDING AN INPUT WORD USING TWO MEMORY OPERATING SPEEDS

(71) Applicant: SAMSUNG ELECTRONICS CO., LTD., Suwon-si (KR)

(72) Inventors: Sejung Kwon, Suwon-si (KR); Dongsoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 17/102,679

(22) Filed: Nov. 24, 2020

(65) Prior Publication Data
US 2021/0240925 A1    Aug. 5, 2021

(30) Foreign Application Priority Data

Jan. 31, 2020    (KR) ........................ 10-2020-0012189

(51) Int. Cl.
*G06F 40/205*    (2020.01)
*G06N 3/04*    (2023.01)
(Continued)

(52) U.S. Cl.
CPC ........ *G06F 40/205* (2020.01); *G06F 12/0813* (2013.01); *G06F 40/237* (2020.01); *G06N 3/04* (2013.01)

(58) Field of Classification Search
CPC .... G06F 12/0813; G06N 3/04; G06N 3/0445; G06N 3/08
See application file for complete search history.

(56) References Cited

U.S. PATENT DOCUMENTS

| 9,659,248 B1 | 5/2017 | Barbosa et al. |
| 10,332,510 B2 | 6/2019 | Lee et al. |

(Continued)

FOREIGN PATENT DOCUMENTS

| JP | 2018-025747 A | 2/2018 |
| KR | 10-2016-0069329 A | 6/2016 |

(Continued)

OTHER PUBLICATIONS

Jang et al. "MnnFast: A Fast and Scalabale System Architecture for Memory-Augmented Neural Networks". ISCA '19, Jun. 22-26, 2019, Phoenix, Az, USA (Year: 2019).*

(Continued)

*Primary Examiner* — Jesse S Pullias
(74) *Attorney, Agent, or Firm* — Sughrue Mion, PLLC

(57) ABSTRACT

An electronic device is provided. The electronic device includes a first memory configured to operate at a first speed and store compressed vectors corresponding to words, and scaling factors corresponding to the compressed vectors; a second memory that is faster than the first memory and is configured to store a first group of the compressed vectors, and store a first group of the scaling factors; and a processor configured to obtain a first compressed vector and a first scaling factor corresponding to an input word from the first memory or the second memory and process the obtained first compressed vector and the obtained first scaling factor by using a neural network.

20 Claims, 10 Drawing Sheets

(51) Int. Cl.
    *G06F 12/0813*     (2016.01)
    *G06F 40/237*     (2020.01)

(56) References Cited

U.S. PATENT DOCUMENTS

| | | | |
|---|---|---|---|
| 10,417,329 B2 | 9/2019 | Ushio et al. | |
| 10,691,886 B2 | 6/2020 | Yu et al. | |
| 2018/0150743 A1* | 5/2018 | Ma | G06N 3/084 |
| 2018/0204120 A1 | 7/2018 | Rei et al. | |
| 2018/0260379 A1* | 9/2018 | Yu | G06N 3/08 |
| 2018/0293071 A1 | 10/2018 | Heinze et al. | |
| 2018/0357240 A1* | 12/2018 | Miller | G06F 16/24578 |
| 2019/0087721 A1* | 3/2019 | Prakash | G06N 3/08 |

FOREIGN PATENT DOCUMENTS

| | | |
|---|---|---|
| KR | 10-2018-0103671 A | 9/2018 |
| WO | 2018/005395 A1 | 1/2018 |

OTHER PUBLICATIONS

Chandar et al. "Hierarchical Memory Networks". arXiv:1605.07427v1 [stat.ML] May 24, 2016 (Year: 2016).*
International Search Report and Written Opinion dated Feb. 22, 2021 by the International Searching Authority in International Application No. PCT/KR2020/016168.

* cited by examiner

ELECTRONIC DEVICE AND OPERATION METHOD FOR EMBEDDING AN INPUT WORD USING TWO MEMORY OPERATING SPEEDS

CROSS-REFERENCE TO RELATED APPLICATION(S)

This application is based on and claims priority under 35 U.S.C. § 119 to Korean Patent Application No. 10-2020-0012189, filed on Jan. 31, 2020, in the Korean Intellectual Property Office, the disclosure of which is incorporated by reference herein in its entirety.

BACKGROUND

1. Field

The disclosure relates to an electronic device and an operation method thereof, and more particularly, to an electronic device for processing input words by using a language model and an operation method of the electronic device.

2. Description of Related Art

An artificial intelligence (AI) system is a computer system that simulates human-level intelligence and enables machines to learn and make decisions on their own. AI systems may improve their recognition rates and become more capable of understanding user's preferences more accurately through experience. Thus, rule-based smart systems are increasingly being replaced by deep learning-based AI systems.

AI technology may be applied to various fields. For example, AI technology may be used in the fields of recognition and processing of language/characters, such as natural language processing, machine translation, a dialog system, question answering, speech recognition/synthesis, etc. For example, an AI system may learn various sentences, generate a language model according to a result of the learning, and use the generated language model to classify words, perform machine translation, provide new words, complete a sentence, or answer questions.

Such a language model includes an embedding matrix that takes words in a sentence as an input. A language model typically deals with at least 10,000 words or more, and therefore the size of the embedding matrix is extremely large. Thus, it is difficult to use a language model in a device with a small memory capacity. Another problem is that all data of the embedding matrix cannot be read during an arithmetic operation using the language model. Thus, some data of the embedding matrix has to be read multiple times and the arithmetic operation needs to be repeatedly performed, which results in large overhead.

SUMMARY

According to embodiments of the disclosure, an electronic device for processing a word by using a language model includes: a first memory configured to operate at a first speed and store a compressed embedding matrix, which includes a plurality of compressed vectors corresponding to a plurality of words, and scaling factors corresponding to the plurality of compressed vectors; a second memory configured to operate at a second speed that is faster than the first speed, store a first group of the plurality of compressed vectors identified based on first frequency information of the plurality of compressed vectors, and store a first group of the scaling factors identified based on second frequency information of the scaling factors; and a processor configured to obtain a first compressed vector and a first scaling factor corresponding to an input word from the first memory or the second memory and process the obtained first compressed vector and the obtained first scaling factor by using a neural network.

The first memory may be separate from the processor, and the processor may include the second memory.

Each of the plurality of compressed vectors may be provided in a corresponding row of the compressed embedding matrix, and a smaller value of an index representing the corresponding row in the compressed embedding matrix may correspond to an increased frequency of a corresponding word.

A second scaling factor may be assigned to k compressed vectors among the plurality of compressed vectors, and a third scaling factor is assigned to m compressed vectors with a lower frequency than the k compressed vectors, wherein k is less than m.

The processor may be further configured to store compressed vectors in the second memory with a frequency greater than or equal to a preset first value based on the first frequency information of the plurality of compressed vectors and store scaling factors in the second memory with a frequency greater than or equal to a preset second value based on the second frequency information of the scaling factors.

The second memory may include a first cache memory configured to store the first group of the plurality of compressed vectors and a second cache memory configured to store the first group of the scaling factors, and the processor may be further configured to: identify whether the first compressed vector is stored in the first cache memory; based on the first compressed vector not being stored in the first cache memory, read the first compressed vector from the first cache memory; based on the first compressed vector being stored in the first cache memory, read the first compressed vector from the first memory; identify whether the first scaling factor exists in the second cache memory; based on the first scaling factor being stored in the second cache memory, read the first scaling factor from the second cache memory; and based on the first scaling factor not being stored in the second cache memory, read the first scaling factor from the first memory.

The processor may be further configured to identify address information of the first scaling factor based on address information of the first compressed vector and obtain the first scaling factor from the first memory or the second memory based on whether the address information of the first scaling factor indicates the first memory or the second memory.

The processor may be further configured to identify the first scaling factor corresponding to the first compressed vector based on mapping information indicating a mapping relationship between the plurality of compressed vectors and the scaling factors.

The electronic device may further include an input interface configured to receive the input word.

The processor may be further configured to obtain a result value based on data output from the neural network, and the electronic device may further include an output interface configured to output the obtained result value.

According to embodiments of the disclosure, an operation method of an electronic device for processing a word by using a language model includes: storing, in a first memory configured to operate and a first speed, a compressed embedding matrix including a plurality of compressed vectors respectively corresponding to a plurality of words and scaling factors corresponding to the plurality of compressed vectors; storing, in a second memory configured to operate at a second speed that is faster than the first speed, a first group of the plurality of compressed vectors identified based on first frequency information of the plurality of compressed vectors; storing, in the second memory, a first group of the scaling factors identified based on second frequency information of the scaling factors; obtaining, from the first memory or the second memory, a first compressed vector and a first scaling factor corresponding to an input word; and processing the obtained first compressed vector and the obtained first scaling factor by using a neural network.

The first memory may be separate from a processor of the electronic device that is configured to process the word, and the processor may include the second memory.

Each of the plurality of compressed vectors may be provided in a corresponding row of the compressed embedding matrix, and a smaller value of an index representing the corresponding row in the compressed embedding matrix may correspond to an increased frequency of a corresponding word.

A second scaling factor may be assigned to k compressed vectors among the plurality of compressed vectors, and a third scaling factor may be assigned to m compressed vectors with a lower frequency than the k compressed vectors, wherein k is less than m.

The storing of the first group of the plurality of compressed vectors and the first group of the scaling factors in the second memory may include storing, in the second memory, compressed vectors with a frequency greater than or equal to a preset first value based on the first frequency information of the plurality of compressed vectors and storing, in the second memory, scaling factors with a frequency greater than or equal to a preset second value based on the second frequency information of the scaling factors.

The second memory may include a first cache memory configured to store the first group of the plurality of compressed vectors and a second cache memory configured to store the first group of the scaling factors, and the obtaining of the first compressed vector and the first scaling factor from the first memory or the second memory may include: identifying whether the first compressed vector is stored in the first cache memory; based on the first compressed vector being stored in the first cache memory, reading the first compressed vector from the first cache memory; based on the first compressed vector not being stored in the first cache memory, reading the first compressed vector from the first memory; identifying whether the first scaling factor is stored in the second cache memory; based on the first scaling factor being stored in the second cache memory, reading the first scaling factor from the second cache memory; and based on the first scaling factor not being stored in the second cache memory, reading the first scaling factor from the first memory.

The obtaining of the first compressed vector and the first scaling factor from the first memory or the second memory may include: identifying address information of the first scaling factor based on address information of the first compressed vector; and obtaining the first scaling factor from the first memory or the second memory based on whether the address information of the first scaling factor indicates the first memory or the second memory.

The obtaining of the first compressed vector and the first scaling factor from the first memory or the second memory may include identifying the first scaling factor corresponding to the first compressed vector based on mapping information indicating a mapping relationship between the plurality of compressed vectors and the scaling factors.

The operation method may include receiving the input word.

The operation method may include: obtaining a result value based on data output from the neural network; and outputting the obtained result value.

According to embodiments of the disclosure, one or more computer-readable recording media having stored therein a program for controlling an electronic device to perform a method, the method including: storing, in a first memory configured to operate and a first speed, a compressed embedding matrix including a plurality of compressed vectors respectively corresponding to a plurality of words and scaling factors corresponding to the plurality of compressed vectors; storing, in a second memory configured to operate at a second speed that is faster than the first speed, a first group of the plurality of compressed vectors identified based on first frequency information of the plurality of compressed vectors; storing, in the second memory, a first group of the scaling factors identified based on second frequency information of the scaling factors; obtaining, from the first memory or the second memory, a first compressed vector and a first scaling factor corresponding to an input word; and processing the obtained first compressed vector and the obtained first scaling factor by using a neural network.

According to embodiments of the disclosure, an electronic device includes: a first memory configured to operate at a first speed and store a plurality of compressed vectors corresponding to a plurality of words, and scaling factors corresponding to the plurality of compressed vectors; a second memory configured to operate at a second speed that is faster than the first speed, and store a first group of the plurality of compressed vectors; a third memory configured to operate at a third speed that is faster than the first speed, and store a first group of the scaling factors; and a processor configured to: identify whether a first compressed vector corresponding to an input word is stored in the second memory; obtain the first compressed vector from the second memory based on the first compressed vector being stored in the second memory; obtain the first compressed vector from the first memory based on the first compressed vector not being stored in the second memory; identify whether a first scaling factor corresponding to the input word is stored in the third memory; obtain the first scaling factor from the third memory based on the first scaling factor being stored in the third memory; obtain the first scaling factor from the first memory based on the first scaling factor not being stored in the third memory; and generate a result value by processing the obtained first compressed vector and the obtained first scaling factor by using a neural network.

The processor may include the third memory, the electronic device may include a fourth memory configured to operate at a fourth speed that is faster than the first speed and slower than the third speed, and the processor may be further configured to: based on the first scaling factor not being stored in the third memory, identify whether the first scaling factor is stored in the fourth memory; obtain the first scaling factor from the fourth memory based on the first scaling factor being stored in the fourth memory and not being stored in the third memory; and obtain the first scaling factor from the first memory based on the first scaling factor not being stored in the third memory and not being stored in the fourth memory.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
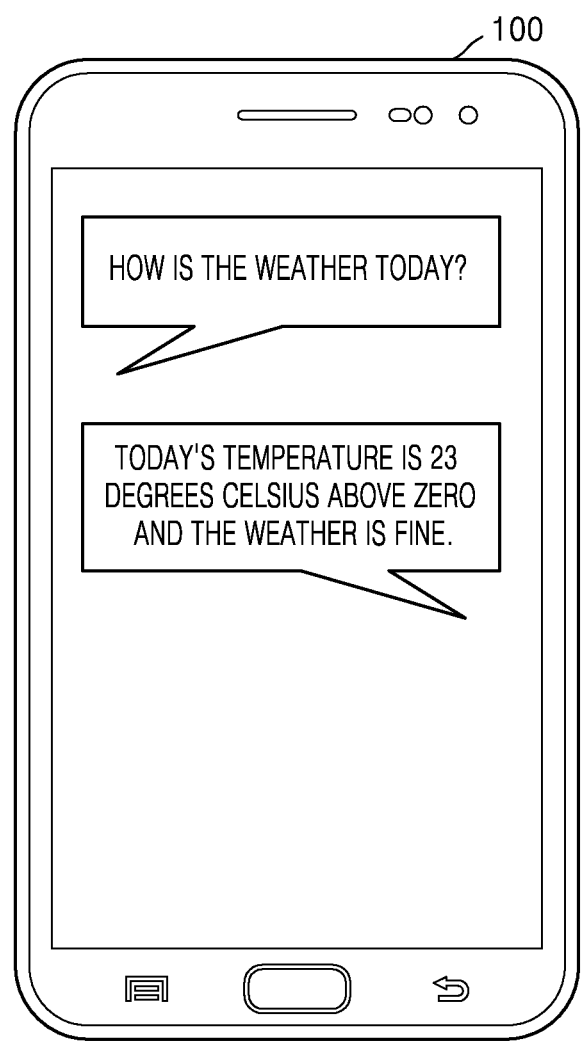
FIG. 1 illustrates an electronic device according to an embodiment.

Hereinafter, embodiments will be described in detail with reference to the accompanying drawings. Embodiments described with reference to each drawing are not mutually exclusive configurations unless otherwise specified, and a plurality of embodiments may be selectively combined and implemented in one apparatus. The combination of the plurality of embodiments may be arbitrarily selected and applied by a person skilled in the art.

The terms used herein are general terms currently widely used in the art based on functions described in embodiments, but may have different meanings according to an intention of one of ordinary skill in the art, precedent cases, or advent of new technologies. Furthermore, some terms may be arbitrarily selected by the applicant, and in this case, the meaning of the selected terms will be described in detail in the detailed description. Thus, the terms used herein should be defined not by simple appellations thereof but based on the meaning of the terms together with the overall description.

As used herein, the terms "1st" or "first" and "second" or "2nd" may use corresponding components regardless of importance or order and are used to distinguish one component from another without limiting the components. For example, a "first" component may be named a "second" component and the "second" component may also be similarly named the "first" component, without departing from the scope of the disclosure.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Throughout the specification, when a part "includes" or "comprises" an element, unless there is a particular description contrary thereto, the part may further include other elements, not excluding the other elements. Furthermore, terms such as "portion," "module," etc. used herein indicate a unit for processing at least one function or operation and may be embodied as hardware or software or a combination of hardware and software.

Throughout the specification, a "user" refers to a person who controls functions or operations of a home appliance (or peripheral device), a display device, and a mobile device, and may include an administrator or installation engineer.

Embodiments will be described more fully hereinafter with reference to the accompanying drawings so that they may be easily implemented by those of ordinary skill in the art. However, the disclosure may have different forms and should not be construed as being limited to the embodiments set forth herein. In addition, parts not related to the description are omitted to clearly describe embodiments, and like reference numerals denote like elements throughout.

FIG. 1 illustrates an electronic device 100 according to an embodiment.

Referring to FIG. 1, the electronic device 100 may be an electronic device for processing an input word by using a language model. The electronic device 100 may be implemented as various types of electronic devices such as a mobile phone, a tablet PC, a digital camera, a camcorder, a laptop computer, a desktop computer, an electronic book terminal, a digital broadcasting terminal, a personal digital assistant (PDA), a portable multimedia player (PMP), a navigation device, an MP3 player, an Internet Protocol television (IPTV), a digital TV (DTV), a wearable device, etc.

According to an embodiment, the electronic device 100 may use a language model to classify a word, perform machine translation, predict a next based on an input word (provide a recommendation word), or provide an answer to an input question. FIG. 1 illustrates an example in which the electronic device provides an answer to an input question by using a language model, but embodiments are not limited thereto.

Referring to FIG. 1, the electronic device 100 may receive a question (e.g., "How is the weather today?"), process words in the received question by using a language model, and obtain an answer to the question. Furthermore, the electronic device 100 may output the answer to the question (e.g., Today's temperature is 23 degrees Celsius above zero, and the weather is fine).

A language model will now be described in detail with reference to FIG. 2.

Figure 2:
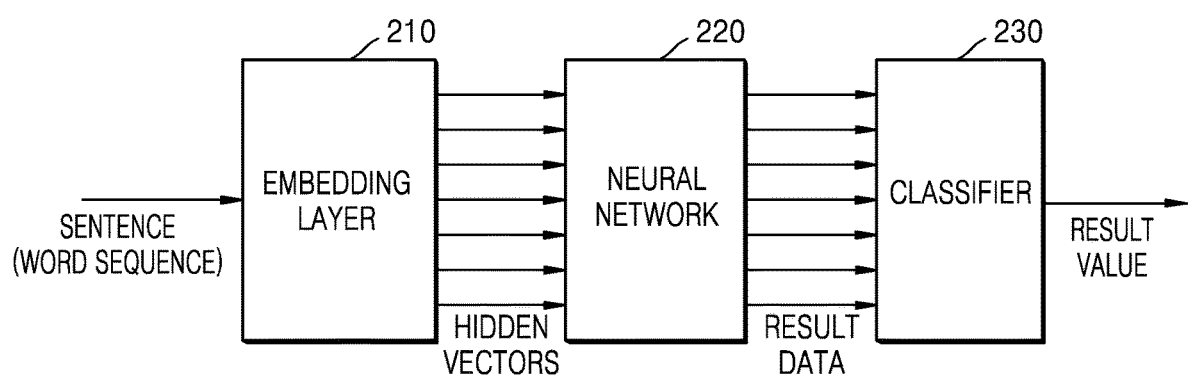
FIG. 2 is a reference diagram for describing a language model according to an embodiment.

FIG. 2 is a reference diagram for describing a language model according to an embodiment.

Referring to FIG. 2, the language model may include an embedding layer 210, a neural network 220, and a classifier 230. A sentence (word sequence) may be input to the embedding layer 210. The embedding layer 210 outputs hidden vectors corresponding to the input word sequence by using an embedding matrix. Each of the hidden vectors may be obtained by multiplying a vector corresponding to each word in the word sequence by an embedding matrix. The embedding matrix will be described in detail below with reference to FIG. 3.

Moreover, the neural network 220 may receive the hidden vectors from the embedding layer 210, perform a predefined arithmetic operation, and output result data obtained via the arithmetic operation to the classifier 230. In this case, the neural network 220 may refer to a recurrent neural network (RNN), and the RNN is a type of deep learning model for learning data that changes overtime, such as time series data. Furthermore, the neural network 220 may include a gated recurrent unit (GRU), long-short term memory (LSTM), a transformer, bidirectional encoder representations from transformers (BERT), etc., and may be constructed in various forms.

The result data output from the neural network 220 may be input to the classifier 230, and the classifier 230 may perform a predefined arithmetic operation to output a result value. For example, the result value output from the classifier 230 may be a result value obtained by classifying a word sequence input to the embedding layer 210 as a particular group. In this case, the result value may be a label corresponding to the word sequence, such as simply "yes" or "no", or may include a plurality of various labels.

Furthermore, although FIG. 2 shows that data output from the neural network 220 is input to the classifier 230, data output from the neural network 220 may be input to a decoder instead of the classifier 230. The decoder may output a result value by performing a predefined arithmetic operation, and the result value output from the decoder may be at least one of a result value obtained by performing machine translation on a word input to the embedding layer 210, a result value obtained by predicting a next word based on an input word, or a result value for an answer to a question input to the embedding layer 210. However, embodiments are not limited thereto.

Figure 3:
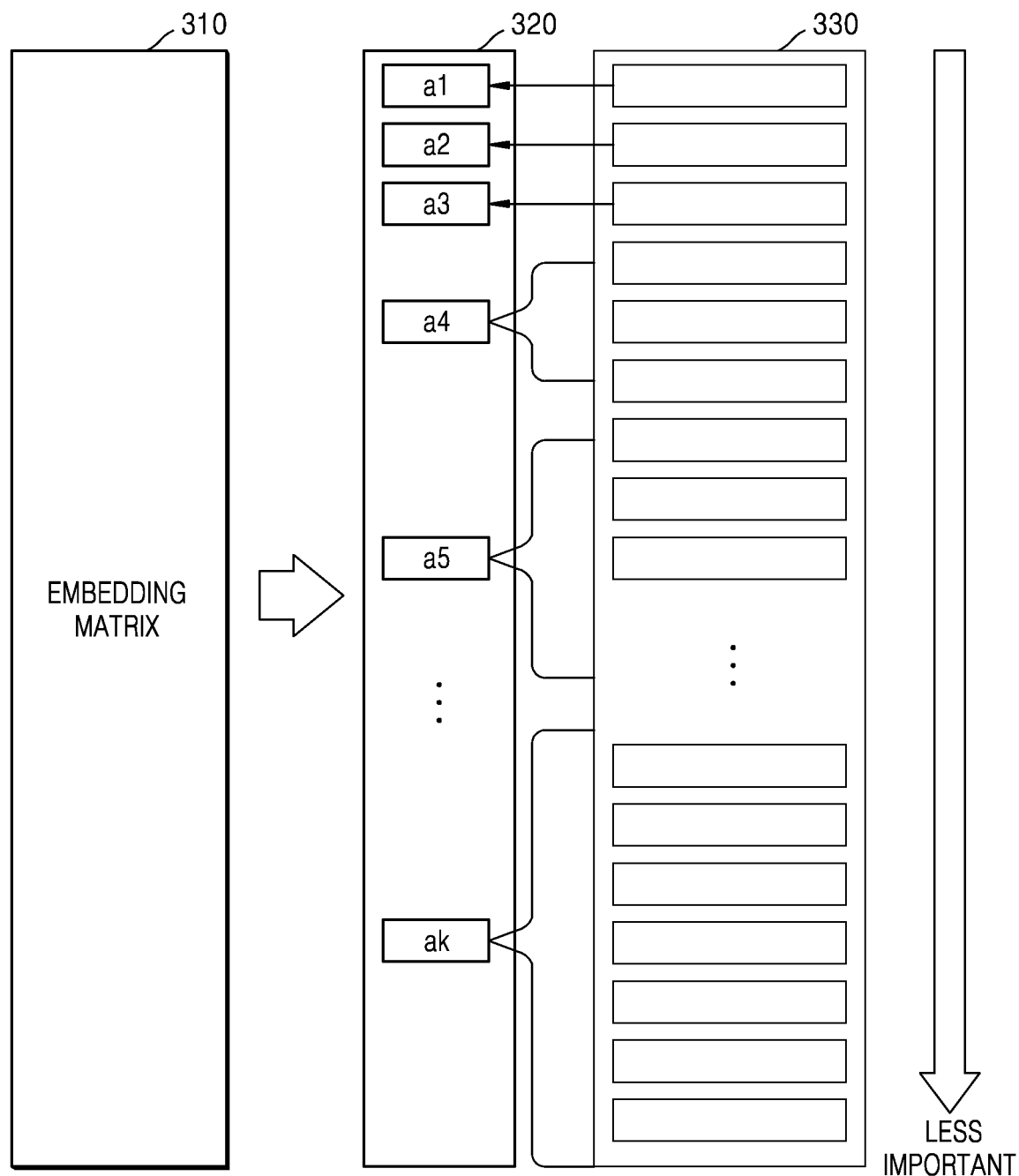
FIG. 3 is a reference diagram for describing a method of compressing an embedding matrix according to an embodiment.

FIG. 3 is a reference diagram for describing a method of compressing an embedding matrix 310 according to an embodiment;

Referring to FIG. 3, the embedding matrix 310 used in the embedding layer 210 may have a size M×N. M and N may be natural numbers. In this case, M may be determined according to the number of words included in a plurality of sentences used to train a language model. Because a multitude of the number of words are generally included in the sentences, M may be much greater than N. For example, when 15,000 different words are included in a plurality of sentences, M may be 15,000 and N may usually be about 300 to about 1000. The embedding matrix 310 may have M columns and N rows.

Because the embedding matrix 310 has a huge size, the entire embedding matrix may not be loaded onto a processor of the electronic device 100 during word processing using the language model, and thus, the processor has to repeatedly read some data of the embedding matrix from a memory outside the processor. This results in large overhead during the word processing, and accordingly, the embedding matrix needs to be compressed to reduce the overhead and increase the efficiency in arithmetic operations for the word processing.

In the embedding layer 210, a vector (a vector corresponding to a word) multiplied by the embedding matrix 310 may be represented as a one-hot vector. The one-hot vector may be a vector having a size 1×M, where one of the M columns will have a value of 1 and the rest will have a value of 0. In this case, one-hot vectors respectively corresponding to a plurality of words may have a value of 1 at different column positions. Accordingly, when a vector corresponding to a word is converted into a hidden vector in the embedding layer 210 by using the embedding matrix 310, one of a plurality of row vectors included in the embedding matrix 310 is obtained as a hidden vector. In this case, a row vector means one of the rows constituting the embedding matrix 310.

Each of the row vectors included in the embedding matrix 310 may be a hidden vector corresponding to each of the words.

Furthermore, the row vectors in the embedding matrix 310 may be arranged based on the frequency of their corresponding words, such that row vectors corresponding to words having a high frequency (frequently used words) may be located at a top portion of the embedding matrix 310. Alternatively, the row vectors in the embedding matrix 310 may be arranged based on the importance of their corresponding words, such that row vectors corresponding to words with high importance may be located at a top portion of the embedding matrix 310. However, embodiments are not limited thereto.

According to an embodiment, the embedding matrix 310 may be compressed by representing each of the row vectors in the embedding matrix 310 as a product of a corresponding one of a plurality of scaling factors 320 and a compressed (quantized) vector in a compressed embedding matrix 330. In this case, each element in a compressed vector may be represented by 1 bit, but embodiments are not limited thereto. Furthermore, the same or different scaling factors may be assigned to each of the row vectors. In this case, the number of scaling factors to be assigned to row vectors may vary according to the importance or frequency of their corresponding words. For example, more scaling factors may be assigned to row vectors with a relatively high importance or frequency (row vectors corresponding to words having a relatively high importance or frequency) than to row vectors with a relatively low importance or frequency (corresponding to words having a relatively low importance or frequency). Accordingly, scaling factors may be assigned to row vectors with a high importance or high frequency in a direction that compression loss (quantization error) decreases even though a compression ratio is low. On the other hand, scaling factors may be assigned to row vectors with a low importance or frequency in a direction that a compression ratio increases even though compression loss (quantization error) increases.

For example, when the embedding matrix 310 includes M row vectors and first through third row vectors have a higher importance or frequency than fourth through sixth row vectors, a different scaling factor may be assigned to each of the first through third row vectors. A scaling factor a1 may be assigned to the first row vector, and the first row vector may be represented as a product of the scaling factor a1 and a first compressed vector. Similarly, the second and third row vectors may be respectively assigned a scaling factor a2 and a scaling factor a3, and accordingly be represented as a product of the scaling factor a2 and a second compressed vector and a product of the scaling factor a3 and a third compressed vector.

Furthermore, the scaling factor a4 may be equally assigned to the fourth through sixth row vectors, and accordingly, the fourth through sixth row vectors may be respectively represented as a product of the scaling factor a4 and a fourth compressed vector, a product of the scaling factor a4 and a fifth compressed vector, and a product of the scaling factor a4 and a sixth compressed vector.

Alternatively, when the first row vector has a higher importance or frequency than the second and third row vectors, two different scaling factors may be assigned to the first row vector. By assigning a scaling factor a1 to a part of the first row vector and a scaling factor a12 to the remaining part thereof, the scaling factors a11 and a12 may be assigned to the first row vector in a direction that compression loss (quantization error) decreases even though a compression ratio is low.

According to an embodiment, the row vectors in the embedding matrix 310 may be arranged in a descending order of frequency or importance and may be divided into a plurality of groups in the order of arrangement such that the same scaling factor may be assigned to each of the groups. In this case, the number of row vectors included in each of the groups located at a top portion of the embedding matrix 310 may be less than that in each of the groups located at a bottom portion thereof. Accordingly, scaling factors may be assigned to row vectors (with a high importance or frequency) located at the top portion in the direction that compression loss (quantization error) decreases even though the compression ratio is low. On the other hand, scaling factors may be assigned to row vectors (with a low importance or frequency) located at the bottom portion in the direction that the compression ratio increases even though compression loss (quantization error) increases.

When the scaling factors 320 and compressed vectors are obtained by compressing the embedding matrix 310, the scaling factors 320 and the compressed vectors may be stored in the electronic device 100. In this case, the compressed vectors may be hereinafter referred to as the compressed embedding matrix 330.

A method, performed by the electronic device 100, of storing compressed vectors (a compressed embedding matrix) and scaling factors, obtaining a compressed vector and a scaling factor corresponding to an input word, and processing the input word by using the obtained compressed vector and scaling factor will now be described in detail with reference to FIGS. 4 through 7.

Figure 4:
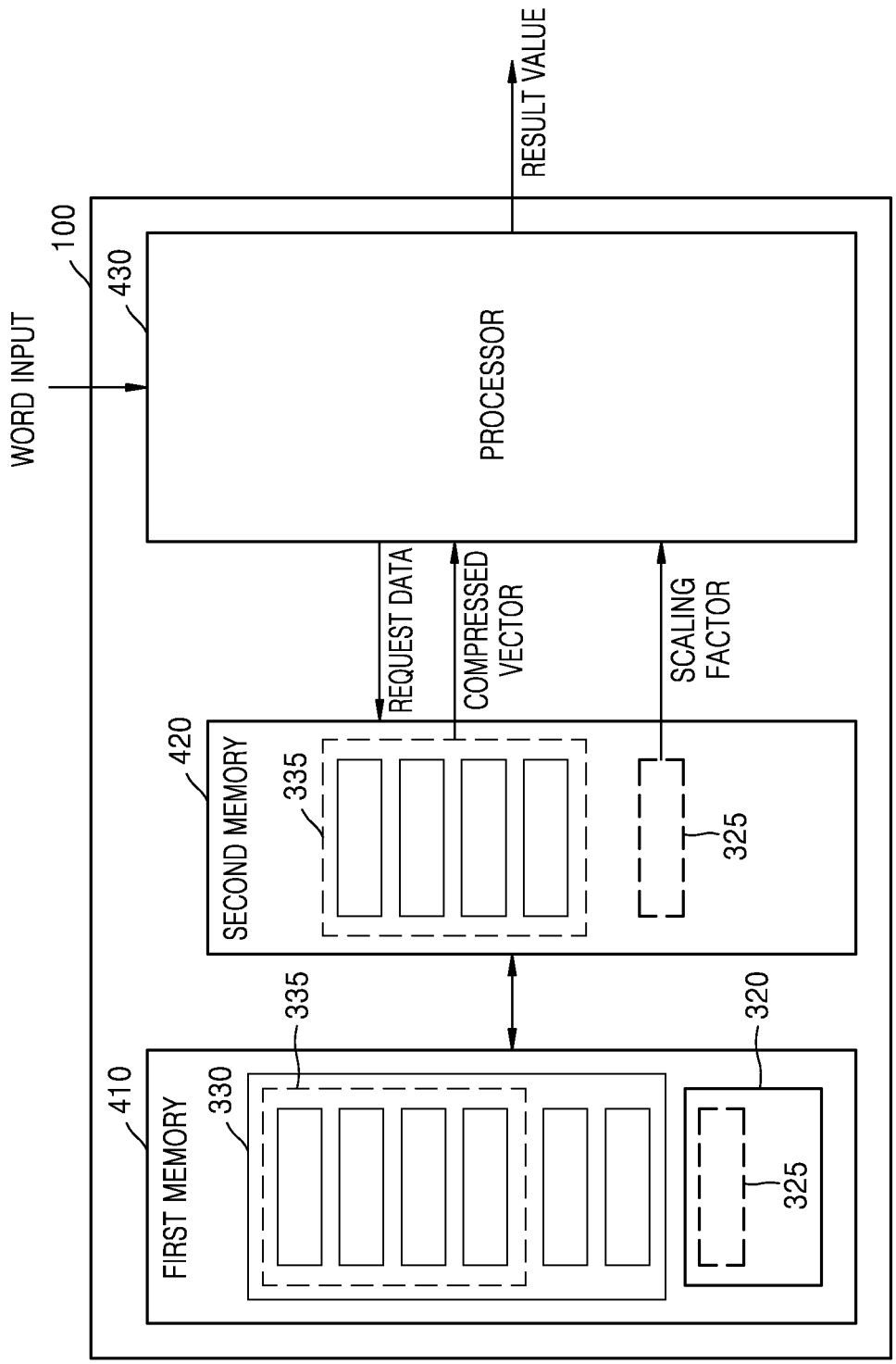
FIG. 4 is a reference diagram for describing an operation, performed by an electronic device, of processing input words by using compressed vectors and scaling factors, according to an embodiment.

FIG. 4 is a reference diagram for describing an operation, performed by the electronic device 100, of processing an input word by using compressed vectors and scaling factors, according to an embodiment.

According to an embodiment, the electronic device 100 may include a first memory 410, a second memory 420, and a processor 430.

As described with reference to FIG. 3, a plurality of scaling factors 320 and a plurality of compressed vectors (a compressed embedding matrix 330) obtained by compressing an embedding matrix may be stored in the first memory 410. The first memory 410 may be a memory located outside the processor 430. The first memory 410 may include dynamic random access memory (DRAM).

The compressed vectors included in the compressed embedding matrix 330 may be arranged in a descending order of frequency or importance, and the higher the frequency or importance of the compressed vectors, the smaller the value of an index corresponding to a row in the compressed embedding matrix 330 is.

Although FIG. 4 illustrates the first memory 410 is a single memory, the first memory 410 may include a plurality of physically separate memories. Accordingly, the scaling factors 320 and the compressed vectors in the compressed embedding matrix 330 may be stored in the same memory or different memories that are physically separate from one another.

According to an embodiment, the second memory 420 may be a memory located outside the processor 430 and include static RAM (SRAM). Furthermore, the second memory 420 may operate at a higher speed and have a smaller capacity than the first memory 410. In addition, the second memory 420 may be expensive compared to the first memory 410.

The second memory 420 may store compressed vectors 335 that are a part of the compressed embedding matrix 330 stored in the first memory 410. In this case, the compressed vectors 335 respectively corresponding to words with a high frequency or importance may be prestored in the second memory 420 based on frequency or importance information of words corresponding to the compressed vectors.

Furthermore, the second memory 420 may operate as a cache memory and store one or more scaling factors 325 among the scaling factors 320 stored in the first memory 410. In this case, the scaling factors 325 with a high frequency or importance may be prestored in the second memory 420 based on frequency or importance information of the scaling factors 320. The frequency or importance information of the scaling factors 325 may be determined based on frequency or importance information of words corresponding to the scaling factors 320. For example, when a first scaling factor is commonly assigned to row vectors respectively corresponding to first through third words and then the row vectors are compressed, frequency or importance information of the first scaling factor may be determined based on a sum or weighted sum of frequencies of the first through third words. Alternatively, when first and second scaling factors are assigned to the row vector corresponding to the first word and then the row vector is compressed, frequency or importance information of each of the first and second scaling factors may be determined based on the frequency of the first word. However, embodiments are not limited thereto.

Although FIG. 4 illustrates the second memory 420 is a single memory, the second memory 420 may include a plurality of physically separate memories. Accordingly, the scaling factors 325 and the compressed vectors 335 may be stored in the same memory or different memories that are physically separate from one another.

To process a word input to the electronic device 100, the processor 430 may obtain a compressed vector and a scaling factor corresponding to the input word (a word included in an input word sequence) from the first or second memory 410 or 420.

The processor 430 may read the compressed vector and the scaling factor corresponding to the input word from the first or second memory 410 or 420. The processor 430 may first transmit, to the second memory 420, a command requesting the compressed vector and the scaling factor corresponding to the input word.

The processor 430 may determine index information (or address information) of a scaling factor assigned to a compressed vector based on index information (or address information) of the compressed vector. For example, the processor 430 may determine index information of a scaling factor corresponding to a compressed vector based on mapping information obtained by mapping index information of a compressed vector to index information of a scaling factor. In this case, index information of a compressed vector may be mapped to index information of a scaling factor according to a preset rule. In this case, the index information of the scaling factor may be determined by performing an arithmetic operation on the index information of the compressed vector. Alternatively, the mapping information may be a mapping table for mapping index information of a compressed vector to index information of a scaling factor, but embodiments are not limited thereto.

The second memory 420 may determine whether the requested compressed vector is stored in the second memory 420 based on the index or address information of the requested compressed vector. When it is determined that the requested compressed vector is stored in the second memory 420, the compressed vector is provided to the processor 430, and when the requested compressed vector is not stored in the second memory 420, the compressed vector is requested from the first memory 410. The first memory 410 may provide the requested compressed vector to the second memory 420 and the processor 430. The second memory 420 may store therein the compressed vector provided from the first memory 410. In this case, the second memory 420 may store the compressed vector provided from the first memory 410 after deleting an oldest or less frequent compressed vector among data previously stored in the second memory 420. Furthermore, one or more compressed vectors stored in the second memory 420 may be set to remain stored in the second memory 420 without being deleted. However, embodiments are not limited thereto.

Furthermore, the second memory 420 determines whether the scaling factor assigned to the requested compressed vector is stored in the second memory 420. When the scaling factor assigned to the requested compressed vector is stored in the second memory 420, the scaling factor is provided to the processor 430, and when the requested compressed vector is not stored in the second memory 420, the scaling factor is requested from the first memory 410. The first memory 410 may provide the requested scaling factor to the second memory 420 and the processor 430. The second memory 420 may store therein the scaling factor provided from the first memory 410. In this case, the second memory 420 may store the scaling factor provided from the first memory 410 after deleting an oldest or less frequent scaling factor among data previously stored in the second memory 420. Furthermore, one or more scaling factors stored in the second memory 420 may be set to remain stored in the second memory 420 without being deleted. However, embodiments are not limited thereto.

The processor 430 may process the input word based on the obtained compressed vector and scaling factor. The processor 430 may process the input word by using the neural network 220 described with reference to FIG. 2. For example, the obtained compressed vector and scaling factor may be input to the neural network 220. In this case, according to a structure of the neural network 220, the obtained compressed vector and scaling factor may be multiplied by each other and input to the neural network 220, or may be input to the neural network 220 as separate values without being multiplied. The processor 430 may output, to the classifier 230 or the decoder, result data obtained by performing a predefined arithmetic operation via the neural network 220. The processor 430 may provide a result value by performing the operation of the classifier 230 or the decoder described with reference to FIG. 2 on the result data output via the neural network 220. Descriptions of the result value are already provided with respect to FIG. 2, and thus are not repeated.

Figure 5:
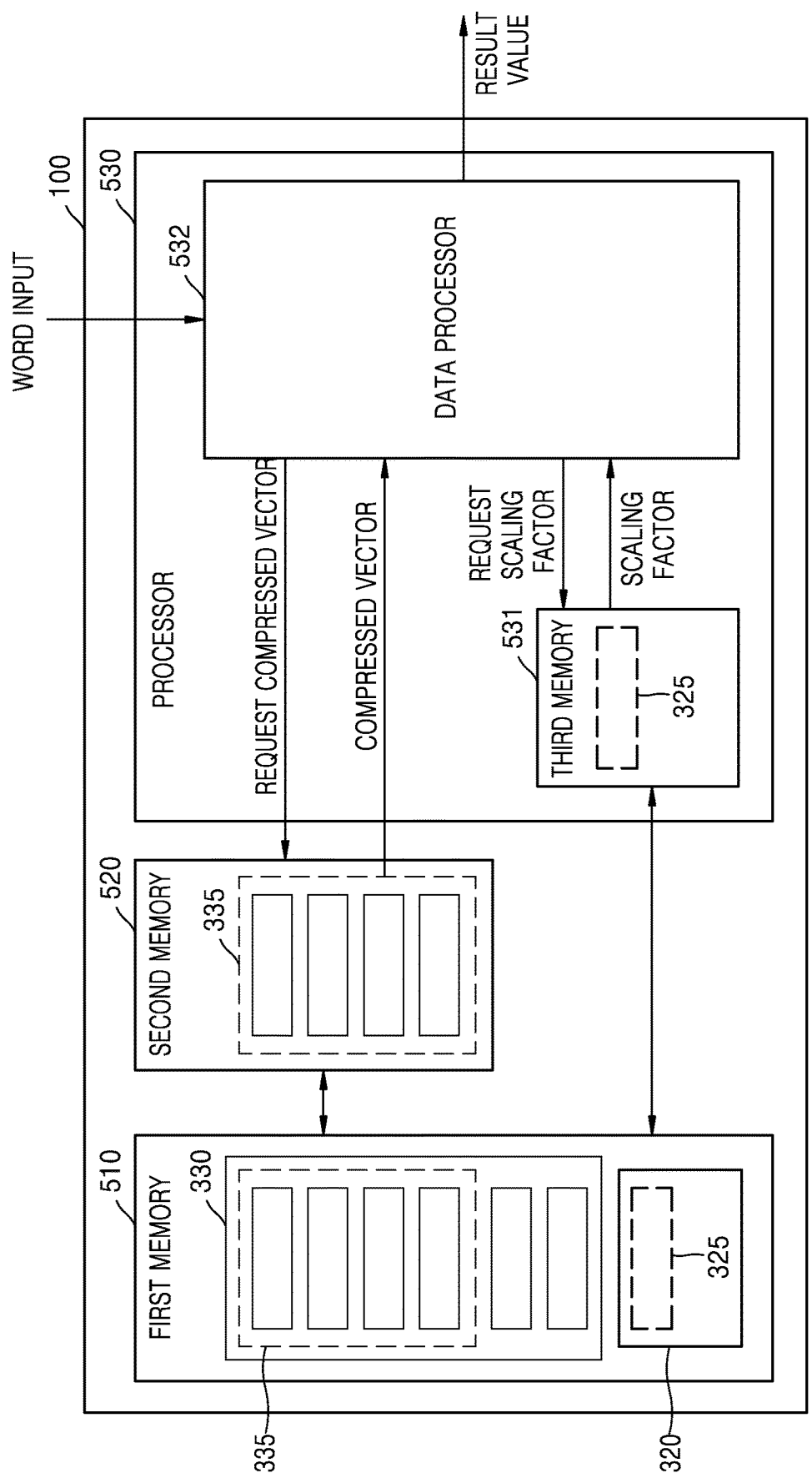
FIG. 5 is a reference diagram for describing an operation, performed by an electronic device, of processing input words by using compressed vectors and scaling factors, according to an embodiment.

FIG. 5 is a reference diagram for describing an operation, performed by an electronic device 100, of processing input words by using compressed vectors and scaling factors, according to an embodiment.

According to an embodiment, the electronic device 100 may include a first memory 510, a second memory 520, and a processor 530.

As described with reference to FIG. 3, a plurality of scaling factors 320 and a plurality of compressed vectors (a compressed embedding matrix 330) obtained by compressing an embedding matrix may be stored in the first memory 510. The first memory 510 is a component corresponding to the first memory 410 of FIG. 4, and descriptions of the first memory 410 that are already provided with respect to FIG. 4 will not be repeated below.

According to an embodiment, the second memory 520 may be a memory located outside the processor 530 and include SRAM. Furthermore, the second memory 520 may store compressed vectors 335 that are a part of the compressed embedding matrix 330 stored in the first memory 510. In this case, the compressed vectors 335 respectively corresponding to words with a high frequency or importance may be prestored in the second memory 520 based on frequency or importance information of words corresponding to the compressed vectors.

According to an embodiment, the processor 530 may include a third memory 531 and a data processor 532.

The third memory 531 may be a memory located within the processor 530. The third memory 531 may include SRAM. Furthermore, the third memory 531 may operate at a higher speed and have a smaller capacity than the first and second memories 510 and 520. In addition, the third memory 531 may be expensive compared to the first and second memories 510 and 520.

The third memory 531 may store one or more scaling factors 325 based on frequency or importance information of a plurality of scaling factors 320 stored in the first memory 510. Because a method of storing the scaling factors 325 based on frequency or importance information has been described in detail with reference to FIG. 4, a detailed description thereof will not be repeated below.

The data processor 532 is a component corresponding to the processor 430 of FIG. 4 and may perform the operations of the processor 430 described with reference to FIG. 4. When a word is input to the data processor 532, the data processor 532 may obtain a compressed vector corresponding to the input word from the second or first memory 520 or 510 and a scaling factor corresponding to the input word from the third or first memory 531 or 510.

Operations performed by the data processor 532 to obtain a compressed vector from the second or first memory 520 or 510 correspond to the operations performed by the processor 430 of FIG. 4 to obtain the compressed vector from the second or first memory 420 or 410. Operations performed by the data processor 532 to obtain a scaling factor from the third or first memory 531 or 510 correspond to the operations performed by the processor 430 of FIG. 4 to obtain the scaling factor from the second or first memory 420 or 410. Thus, descriptions similar to the operations already provided above with respect to FIG. 4 will be omitted below.

Furthermore, the data processor 532 may process the input word based on the obtained compressed vector and scaling factor. Because a method performed by the data processor 532 to process the input word based on the compressed vector and scaling factor corresponds to the method performed by the processor 430 of FIG. 4 to process the input word, a detailed description thereof will be omitted here.

Figure 6:
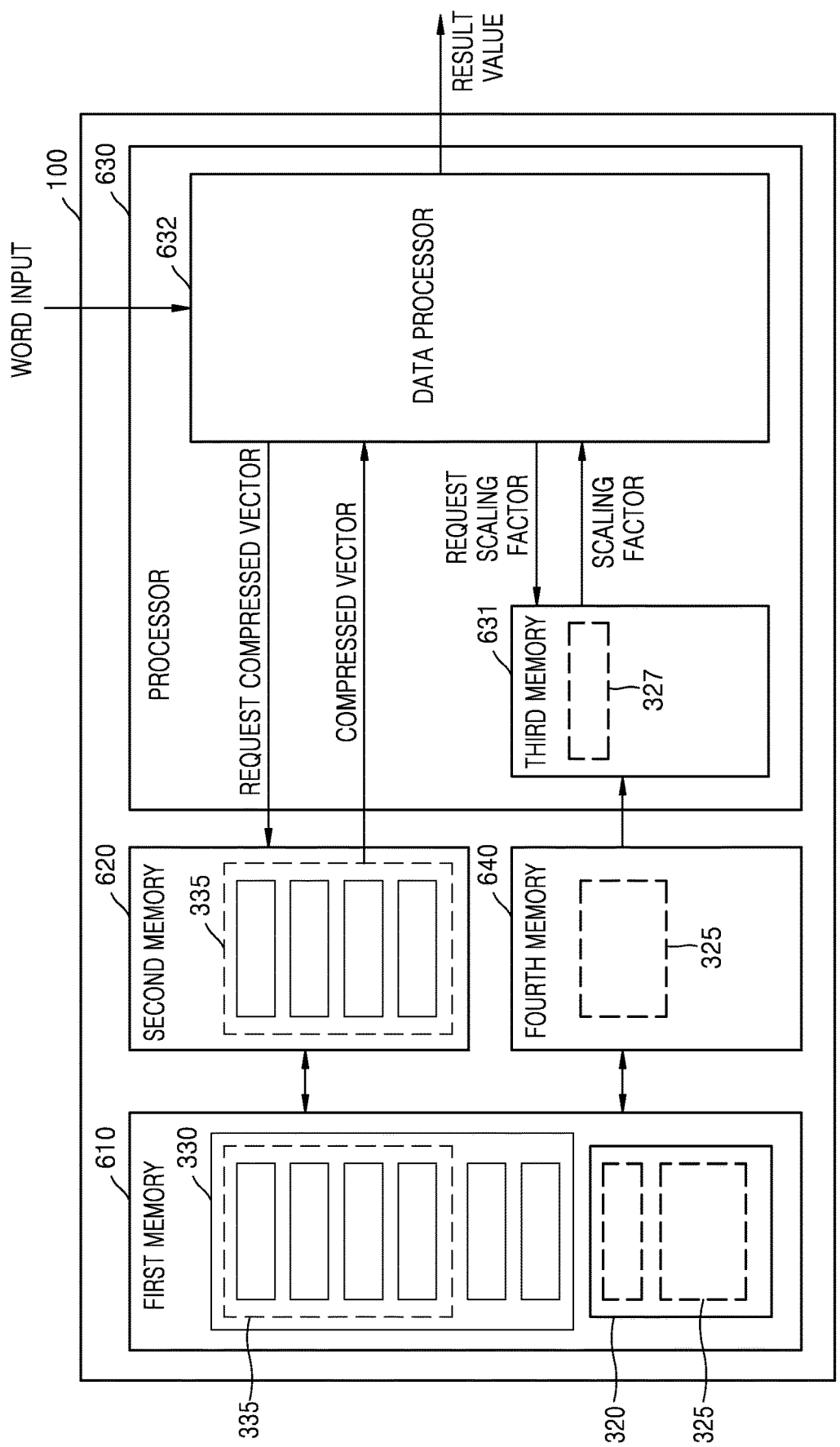
FIG. 6 is a reference diagram for describing an operation, performed by an electronic device, of processing input words by using compressed vectors and scaling factors, according to an embodiment.

FIG. 6 is a reference diagram for describing an operation, performed by an electronic device 100, of processing input words by using compressed vectors and scaling factors, according to an embodiment.

According to an embodiment, the electronic device 100 may include a first memory 610, a second memory 620, a processor 630, and a fourth memory 640, and the processor 630 may include a third memory 631 and a data processor 632.

As described with reference to FIG. 3, a plurality of scaling factors 320 and a plurality of compressed vectors (a compressed embedding matrix 330) obtained by compressing an embedding matrix may be stored in the first memory 610. The first memory 610 is a component corresponding to the first memory 410 of FIG. 4, and descriptions of the first memory 410 that are already provided with respect to FIG. 4 will not be repeated below.

According to an embodiment, the second memory 620 is a component corresponding to the second memory 520 of FIG. 5 and may store compressed vectors 335 that are a part of the compressed embedding matrix 330 stored in the first memory 610. Descriptions of the second memory 520 are already provided above with respect to FIG. 5, and thus, are not repeated.

According to an embodiment, the fourth memory 640 may be a memory located outside the processor 630 and include SRAM. Furthermore, the fourth memory 640 may store one or more scaling factors 325 among a plurality of scaling factors 320 stored in the first memory 610. Because a method of storing the scaling factors 325 based on frequency or importance information has been described in detail with reference to FIG. 4, a detailed description thereof will be omitted here.

According to an embodiment, the third memory 631 may be a memory located within the processor 630 and include SRAM. The third memory 631 may operate at a higher speed and have a smaller capacity than the first, second, and fourth memories 610, 620, and 640. Furthermore, the third memory 631 may be expensive compared to the first, second, and fourth memories 610, 620, and 640.

Furthermore, the third memory 631 may store one or more scaling factors 327 based on frequency or importance information of the scaling factors 320 stored in the first memory 610. In this case, the scaling factors 327 stored in the third memory 631 may be scaling factors with a higher frequency or importance than the scaling factors 325 stored in the fourth memory 640.

The data processor 632 is a component corresponding to the processor 430 of FIG. 4 and may perform the operations of the processor 430 described with reference to FIG. 4. When a word is input to the data processor 632, the data processor 632 may obtain a compressed vector corresponding to the input word from the second or first memory 620 or 610. Because operations performed by the data processor 632 to obtain a compressed vector from the second or first memory 620 or 610 correspond to the operations performed by the processor 430 of FIG. 4 to obtain the compressed vector from the second or first memory 420 or 410, detailed descriptions thereof will be omitted here.

Furthermore, the data processor 632 may obtain a scaling factor corresponding to the input word from one of the third, fourth, and first memories 631, 640, and 610.

The data processor 632 may first transmit, to the third memory 631, a command requesting the scaling factor corresponding to the input word.

The third memory 631 may determine whether the requested scaling factor is stored in the third memory 631. When it is determined that the requested scaling factor is stored in the third memory 631, the scaling factor is provided to the data processor 632, and when the requested scaling factor is not stored in the third memory 631, the scaling factor is requested from the fourth memory 640. The fourth memory 640 may also determine whether the requested scaling factor is stored in the fourth memory 640, and when the requested scaling factor is stored in the fourth memory 640, the scaling factor may be provided to the data processor 632 directly or via the third memory 631. On the other hand, when the requested scaling factor is not stored in the fourth memory 640, the scaling factor may be requested from the first memory 610. The first memory 610 may provide the scaling factor to the data processor 632 directly or via the fourth and third memories 640 and 631.

The fourth memory 640 may store the scaling factor provided from the first memory 610. In this case, the fourth memory 640 may store the scaling factor provided from the first memory 610 after deleting an oldest or less frequent scaling factor among data previously stored in the fourth memory 640. Furthermore, one or more of the scaling factors 327 stored in the third memory 631 may be set to remain stored in the third memory 631 without being replaced with new data. However, embodiments are not limited thereto.

Furthermore, the data processor 632 may process the input word based on the obtained compressed vector and scaling factor. Because a method performed by the data processor 632 to process the input word based on the compressed vector and scaling factor corresponds to the method performed by the processor 430 of FIG. 4 to process the input word, a detailed description thereof will be omitted here.

Figure 7:
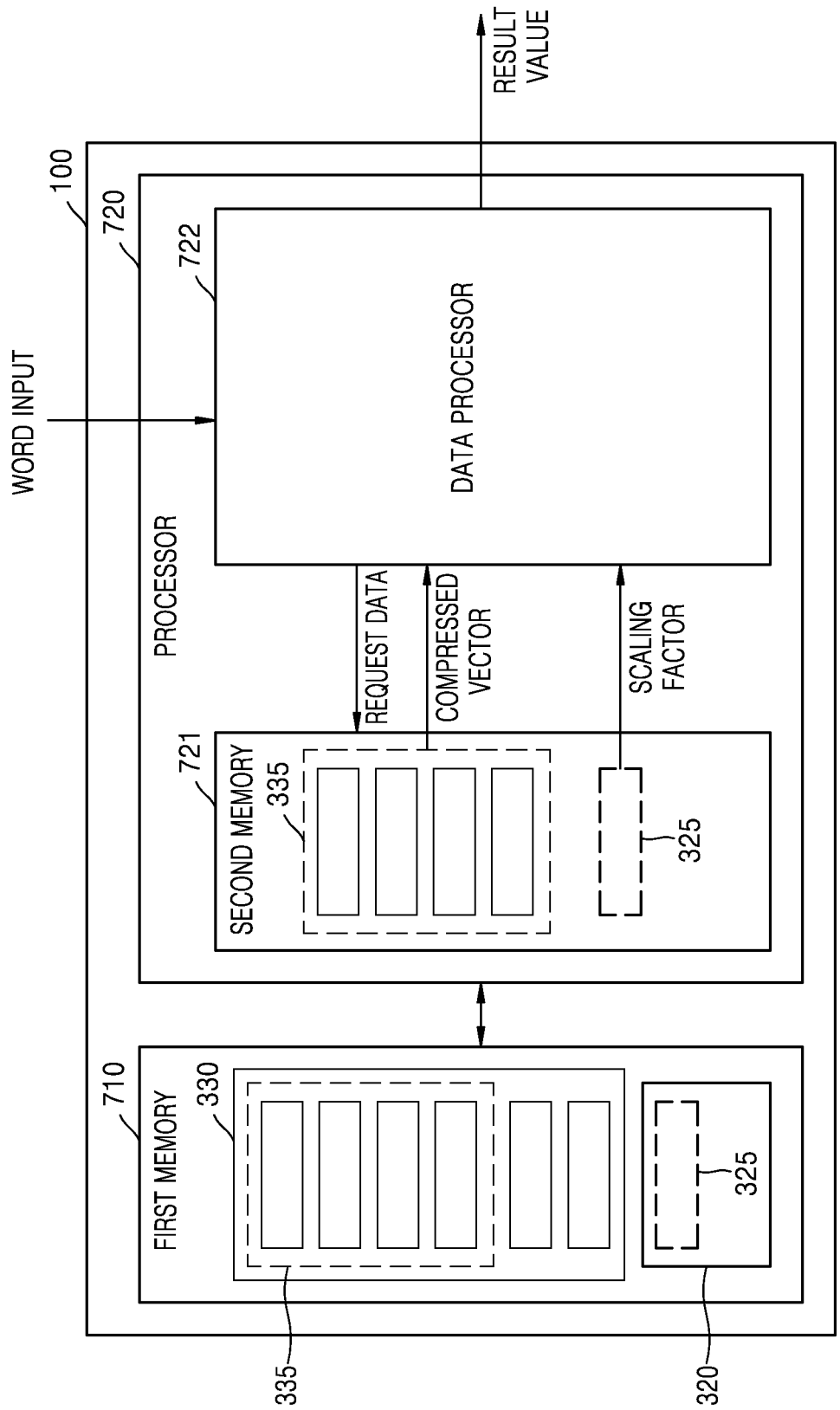
FIG. 7 is a reference diagram for describing an operation, performed by an electronic device, of processing input words by using compressed vectors and scaling factors, according to an embodiment.

FIG. 7 is a reference diagram for describing an operation, performed by an electronic device 100, of processing input words by using compressed vectors and scaling factors, according to an embodiment.

According to an embodiment, the electronic device 100 may include a first memory 710 and a processor 720. Furthermore, the processor 720 may include a second memory 721 and a data processor 722.

The first memory 710 is a component corresponding to the first memory 410 of FIG. 4, and descriptions similar to the first memory 410 that are already provided with respect to FIG. 4 will not be repeated below.

According to an embodiment, the second memory 721 may be a memory located within the processor 720. The second memory 721 may include SRAM. Furthermore, the second memory 721 may operate at a higher speed and have a smaller capacity than the first memory 710. In addition, the second memory 721 may be expensive compared to the first memory 710.

The second memory 721 may store compressed vectors 335 that are a part of a compressed embedding matrix 330 stored in the first memory 710. In this case, the compressed vectors 335 respectively corresponding to words with a high frequency or importance may be prestored in the second memory 721 based on frequency or importance information of words corresponding to the compressed vectors.

Furthermore, the second memory 721 may store one or more scaling factors 325 among a plurality of scaling factors 320 stored in the first memory 410. In this case, the scaling factors 325 corresponding to words with a high frequency may be prestored in the second memory 721 based on frequency information of words corresponding to the scaling factors 320.

Although FIG. 7 illustrates the second memory 721 is a single memory, the second memory 721 may include a plurality of physically separate memories. Accordingly, the scaling factors 325 and the compressed vectors 335 may be stored in the same memory or different memories that are physically separate from one another.

The data processor 722 is a component corresponding to the processor 430 of FIG. 4 and may perform the operations of the processor 430 described with reference to FIG. 4. When a word is input to the data processor 722, the data processor 722 may obtain a compressed vector and a scaling factor corresponding to the input word from the first or second memory 710 or 721.

Operations performed by the data processor 722 to obtain a compressed vector and a scaling factor from the second or first memory 721 or 710 correspond to the operations performed by the processor 430 of FIG. 4 to obtain the compressed vector and the scaling factor from the second or first memory 420 or 410, and thus, are not repeated.

Furthermore, the data processor 722 may process the input word based on the obtained compressed vector and scaling factor. Because a method performed by the data processor 722 to process the input word based on the compressed vector and scaling factor corresponds to the method performed by the processor 430 of FIG. 4 to process the input word, a detailed description thereof will be omitted here.

Figure 8:
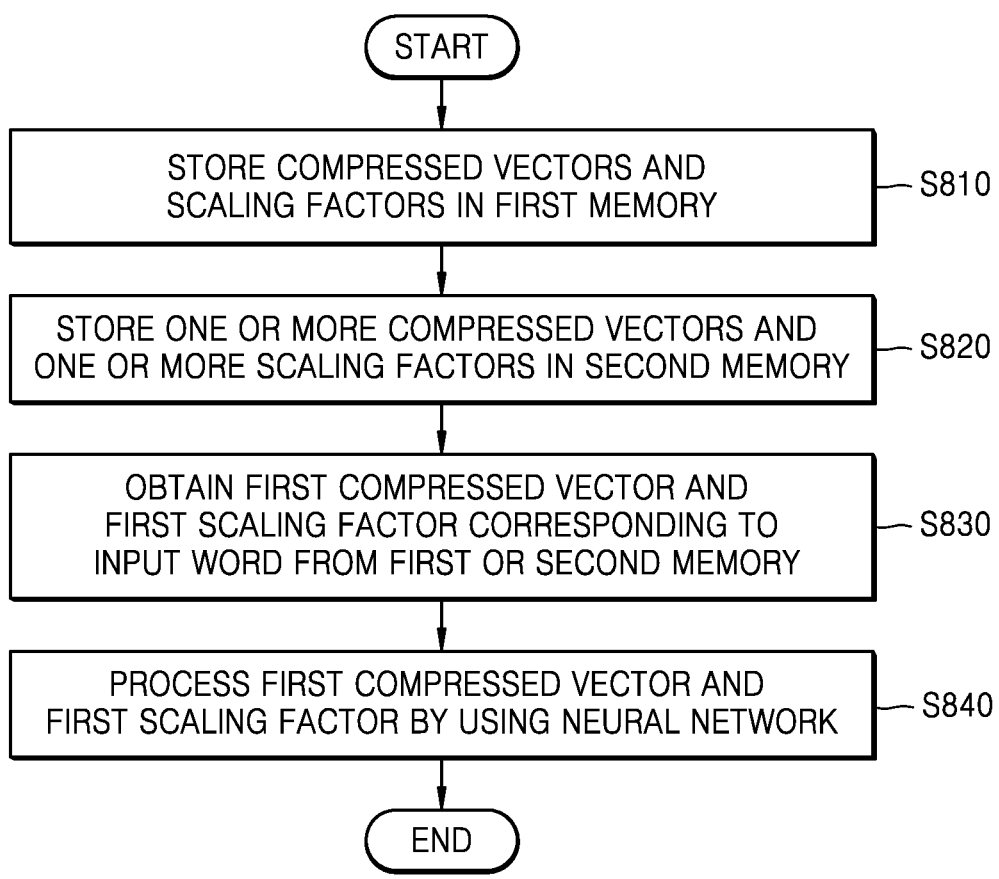
FIG. 8 is a flowchart of an operation method of an electronic device, according to an embodiment.

FIG. 8 is a flowchart of an operation method of the electronic device 100, according to an embodiment.

Referring to FIG. 8, the electronic device 100 may store compressed vectors and scaling factors in a first memory (operation S810). In this case, the compressed vectors (which may be stored in a compressed embedding matrix) and the scaling factors may be obtained by compressing an embedding matrix, as described with reference to FIG. 3. The first memory may be a memory located outside a processor of the electronic device 100 and include DRAM. The compressed vectors may be arranged in a descending order of frequency or importance in the compressed embedding matrix, and the higher frequency or importance the compressed vectors have, the smaller value an index corresponding to a row in the compressed embedding matrix has.

The electronic device 100 may store one or more of the compressed vectors and one or more of the scaling factors in a second memory (operation S820). The second memory may operate at a high speed and have a small capacity and may be expensive compared to the first memory. Furthermore, the second memory may be located outside or within the processor.

The electronic device 100 may store one or more scaling factors and one or more compressed vectors in different memories that are physically separate from one another. In addition, the electronic device 100 may store one or more compressed vectors in the second memory located outside the processor and store one or more scaling factors in the second memory located within the processor. However, embodiments are not limited thereto.

The electronic device 100 may store, in the second memory, one or more compressed vectors corresponding to words with a high frequency or importance based on frequency or importance information of words corresponding to the compressed vectors. Furthermore, the electronic device 100 may store, in the second memory, one or more scaling factors with a high frequency or importance based on frequency or importance information of the scaling factors. Because a method of determining frequency or importance information of scaling factors have been described in detail with reference to FIG. 4, a detailed description thereof will not be repeated below.

The electronic device 100 may receive a word and obtain a first compressed vector and a first scaling factor corresponding to the received word from the first or second memory in order to process the received word (operation S830).

The electronic device 100 may transmit, to the second memory, a command requesting the first compressed vector and the first scaling factor corresponding to the received word.

The electronic device 100 may determine index information (or address information) of the first scaling factor assigned to the first compressed vector based on index information (or address information) of the first compressed vector. For example, the electronic device 100 may determine index information of the first scaling factor corresponding to the first compressed vector based on mapping information obtained by mapping index information of a compressed vector to index information of a scaling factor.

When the requested first compressed vector is stored in the second memory, the electronic device 100 may obtain the first compressed vector from the second memory. On the other hand, when the requested first compressed vector is not stored in the second memory, the electronic device 100 may obtain the first compressed vector from the first memory and then store the first compressed vector in the second memory. When the first compressed vector is stored in the second memory, the electronic device 100 may delete an oldest or less frequent compressed vector among data previously stored in the second memory and store the first compressed vector provided from the first memory.

Furthermore, when the requested first scaling factor is stored in the second memory, the electronic device 100 may obtain the first scaling factor from the second memory, and when the first scaling factor is not stored in the second memory, the electronic device 100 may obtain the first scaling factor from the first memory.

The electronic device 100 may process the word based on the obtained first compressed vector and first scaling factor (operation S840). The electronic device 100 may process the word by using the neural network 220 described with reference to FIG. 2. For example, the electronic device 100 may input obtained compressed vector and scaling factor to the neural network 220. In this case, according to the structure of the neural network 220, the electronic device 100 may input a result of multiplying the first compressed vector by the first scaling factor to the neural network 220 or input the first compressed vector and the first scaling factor as separate values to the neural network 220 without multiplying them. The electronic device 100 may output, to the classifier 230 or the decoder, result data obtained by performing a predefined arithmetic operation via the neural network 220. The electronic device 100 may provide a result value by performing the operation of the classifier 230 or the decoder described with reference to FIG. 2 on the result data output via the neural network 220. Descriptions of the result value are already provided with respect to FIG. 2, and thus are not repeated.

Figure 9:
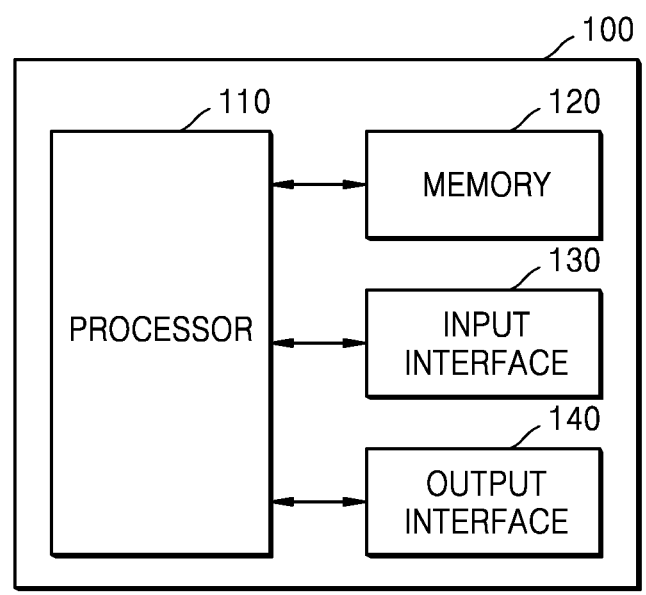
FIG. 9 is a block diagram of a configuration of an electronic device according to an embodiment.

FIG. 9 is a block diagram of a configuration of an electronic device 100 according to an embodiment.

Referring to FIG. 9, the electronic device 100 may include a processor 110, a memory 120, an input interface 130, and an output interface 140.

According to an embodiment, the input interface 130 may receive various user inputs. The input interface 130 may include a device via which a user inputs a word or a word sequence (sentence) and may be implemented in various forms according to an embodiment. For example, the input interface 130 may include a keypad, a button, and a touch pad, a microphone for receiving a user's voice, a camera for detecting a user's motion, etc., which are provided in the electronic device 100, but embodiments are not limited thereto.

According to an embodiment, the processor 110 may control all operations of the electronic device 100. Furthermore, the processor 110 may control other components included in the electronic device 100 to perform predefined operations.

According to an embodiment, the processor 110 may execute one or more programs stored in the memory 120. The processor 110 may have a single core, a dual core (two cores), a triple core (three cores), a quad core (four cores), or multiple cores therein. Furthermore, the processor 110 may include a plurality of processors.

According to an embodiment, the memory 120 may store various data, programs, or applications for driving and controlling the electronic device 100.

A program stored in the memory 120 may include one or more instructions. Furthermore, a program (one or more instructions) or an application stored in the memory 120 may be executed by the processor 110.

According to an embodiment, the processor 110 may correspond to at least one of the processors 430, 530, 630, or 720 shown and described with reference to FIGS. 4 through 7, and the memory 120 may include at least one of the memories described with reference to FIGS. 4 through 7, i.e., the first and second memories 410 and 420 of FIG. 4, the first through third memories 510, 520, and 531 of FIG. 5, the first through fourth memories 610, 620, 631, and 640 of FIG. 6, and the first memory 710 and the second memory 721 of FIG. 7.

According to an embodiment, the memory 120 may store compressed vectors and scaling factors, and because a method performed by the memory 120 to store the compressed vectors and scaling factors has been described in detail with reference to FIGS. 4 through 7, a detailed description thereof will be omitted here.

The processor 110 may obtain, from the memory 120, a compressed vector and a scaling factor corresponding to a word input via the input interface 130. The processor 110 may process the input word based on the obtained compressed vector and scaling factor. The processor 110 may process the word by using the neural network 220 described with reference to FIG. 2. For example, the obtained compressed vector and scaling factor may be input to the neural network 220. In this case, according to the structure of the neural network 220, the obtained compressed vector and scaling factor may be multiplied by each other and input to the neural network 220, or may be input to the neural network 220 as separate values without being multiplied. The processor 110 may output, to the classifier 230 or the decoder, result data obtained by performing a predefined arithmetic operation via the neural network 220. The processor 110 may provide a result value by performing the operation of the classifier 230 or the decoder described with reference to FIG. 2 on the result data output via the neural network 220. For example, the result value may include, but is not limited to, at least one of a result value obtained by classifying a word or word sequence as a particular group, a result value obtained by performing machine translation on the input word or word sequence, a result value obtained by predicting a next word based on the input word, or a result value for an answer to the input word sequence.

According to an embodiment, the output interface 140 may output a result value for an input word or word sequence in various forms. The output interface 140 may include a display and an audio output interface. For example, the display may visually provide a result value for the input word or word sequence to the user, and the audio output interface may include a speaker that is controlled to audibly provide a result value for an input word or word sequence to the user. However, embodiments are not limited thereto.

Figure 10:
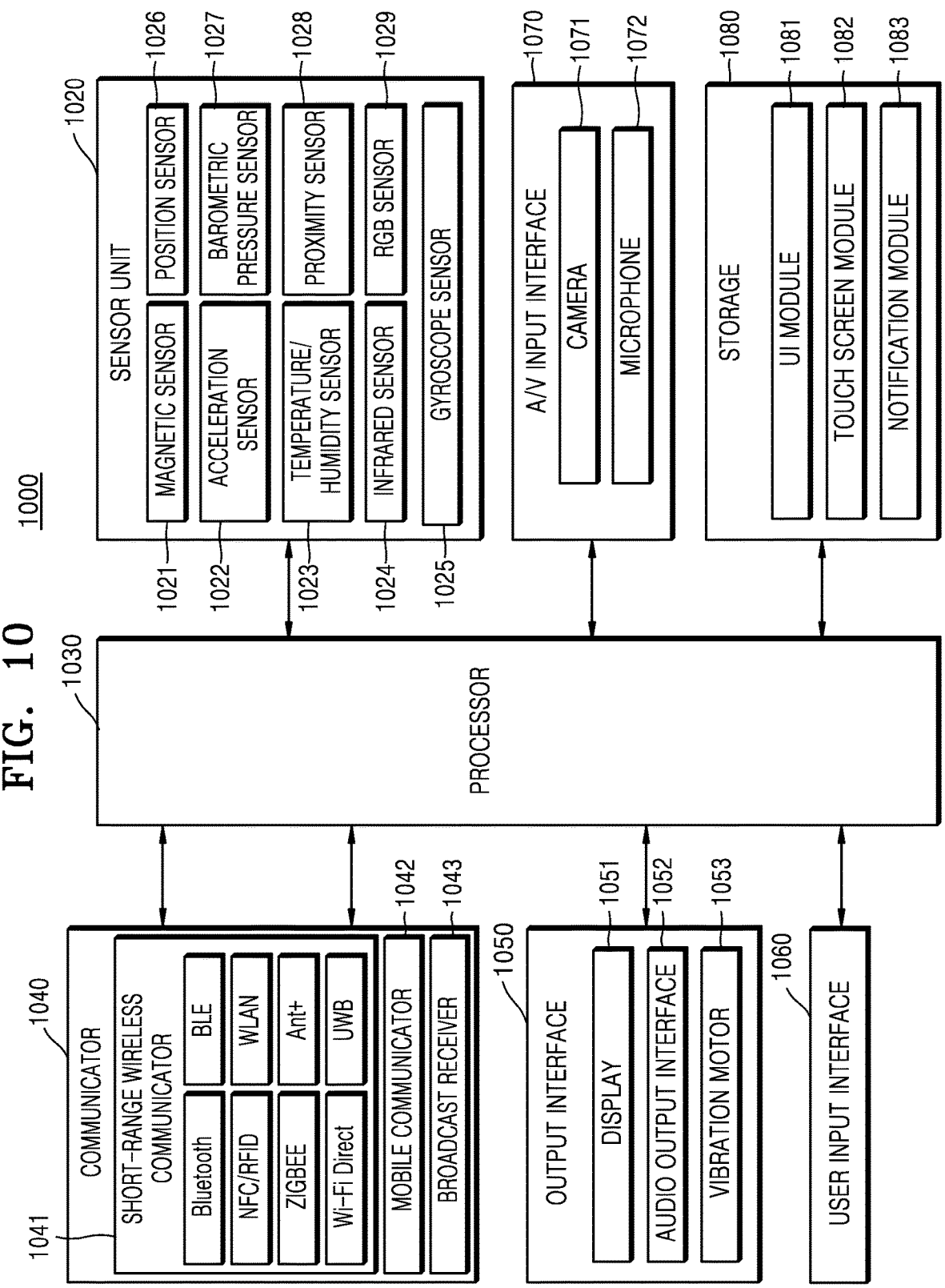
FIG. 10 is a block diagram of a configuration of an electronic device according to another embodiment.

FIG. 10 is a block diagram of a configuration of an electronic device 1000 according to another embodiment. The electronic device 1000 of FIG. 10 is an embodiment of the electronic device 100 of FIG. 1.

Referring to FIG. 10, the electronic device 1000 may include a processor 1030, a sensor unit 1020, a communicator 1040, an output interface 1050, a user input interface 1060, an audio/video (A/V) input interface 1070, and a storage 1080.

The processor 1030, the storage 1080, the user input interface 1060, and the output interface 1050 of FIG. 10 may respectively correspond to the processor 110, the memory 120, the input interface 130, and the output interface 140 of FIG. 9. Descriptions that are already provided above with respect to FIG. 9 will be omitted here.

The communicator 1040 may include one or more components that enable the electronic device 1000 to communicate with an external device or server. For example, the communicator 1040 may include a short-range wireless communicator 1041, a mobile communicator 1042, and a broadcast receiver 1043.

The short-range wireless communicator 1041 may include, but is not limited to, any one or any combination of a Bluetooth communication module, a Near Field Communication (NFC) module, a wireless local area network (WLAN) or Wi-Fi communication module, a Zigbee communication module, an Infrared Data Association (IrDA) communication module, a Wi-Fi Direct (WFD) communication module, an ultra-wideband (UWB) communication module, and an Ant+ communication module.

The mobile communicator 1042 transmits or receives a wireless signal to or from at least one of a base station, an external terminal, or a server on a mobile communication network. In this case, the wireless signal may include a voice call signal, a video call signal, or data in any one of various formats according to transmission and reception of a text/multimedia message.

The broadcast receiver 1043 receives broadcast signals and/or broadcast-related information from the outside via a broadcast channel. The broadcast channel may include a satellite channel and a terrestrial channel. According to an embodiment, the electronic device 1000 may not include the broadcast receiver 1043.

The output interface 1050 is a component for outputting an audio signal, a video signal, or a vibration signal and may include a display 1051, an audio output interface 1052, a vibration motor 1053, etc.

The audio output interface 1052 may output audio data received from the communicator 1040 or stored in the storage 1080. Furthermore, the audio output interface 1052 may also output sound signals (e.g., a call signal reception sound, a message reception sound, and a notification sound) associated with functions performed by the electronic device 1000. The audio output interface 1052 may include a speaker, a buzzer, etc.

The vibration motor 1053 may output a vibration signal. According to an embodiment, the vibration motor 1053 may output a vibration signal corresponding to an output of video data or audio data (e.g., a call signal reception sound, a message reception sound, etc.). Furthermore, the vibration motor 1053 may output a vibration signal when a touch is input on a touch screen.

The processor 1030 controls all operations of the electronic device 1000. For example, the processor 1030 may control the communicator 1040, the output interface 1050, the user input interface 1060, the sensor unit 1020, and the A/V input interface 1070 by executing programs stored in the storage 1080.

The user input interface 1060 is a device via which the user inputs data necessary for controlling the electronic device 1000. Examples of the user input interface 1060 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

The sensor unit 1020 may include a sensor for sensing biometric information of a user (e.g., a fingerprint recognition sensor) as well as a sensor for detecting a status of the electronic device 1000 or the surroundings thereof. Furthermore, the sensor unit 1020 may transmit information detected by the sensors to the processor 1030.

The sensor unit 1020 may include, but is not limited to, at least one of a magnetic sensor 1021, an acceleration sensor 1022, a temperature/humidity sensor 1023, an infrared sensor 1024, a gyroscope sensor 1025, a position sensor (e.g., GPS) 1026, a barometric pressure sensor 1027, a proximity sensor 1028, or an RGB sensor (an illuminance sensor) 1029. Because the function of each sensor may be intuitively inferred from its name by those of ordinary skill in the art, detailed descriptions thereof will be omitted below.

The A/V input interface 1070 is a component for inputting an audio or video signal and may include a camera 1071, a microphone 1072, etc. The camera 1071 may obtain an image frame such as a still or moving image via an image sensor in a video call mode or capture mode. An image captured via the image sensor may be processed by the processor 1030 or a separate image processor.

The image frame processed by the camera 1071 may be stored in the storage 1080 or transmitted to the outside via the communicator 1040. The camera 1071 may include two or more cameras depending on the configuration of the electronic device 1000.

The microphone 1072 receives an external sound signal and process the sound signal as electrical audio data. For example, the microphone 1072 may receive a sound signal from an external device or a speaker. The microphone 1072 may use various noise removal algorithms to remove noise generated in the process of receiving an external sound signal.

The storage 1080 may store programs necessary for processing or control operations performed by the processor 1030 or store input/output data (e.g., application, content, time zone information of an external device, address book, etc.).

For example, the storage 1080 may include at least one of types of storage media, i.e., a flash memory-type memory, a hard disk-type memory, a multimedia card micro-type memory, a card-type memory (e.g., an SD card or an XD memory), RAM, SRAM, read-only memory (ROM), electrically erasable programmable ROM (EEPROM), PROM, a magnetic memory, a magnetic disc, or an optical disc. In addition, the electronic device 1000 may operate a web storage or a cloud server that performs a storage function of the storage 1080 on the Internet.

Programs stored in the storage 1080 may be categorized into a plurality of modules according to their functions, such as a user interface (UI) module 1081, a touch screen module 1082, and a notification module 1083.

The UI module 1081 may provide a specialized UI, a graphical UI (GUI), etc. interworking with the electronic device 1000 for each application. The touch screen module 1082 may detect a user's touch gesture on a touch screen and transmit information about the detected touch gesture to the processor 1030.

The touch screen module 1082 may recognize and analyze a touch code. The touch screen module 1082 may be formed by separate hardware components including a controller.

The notification module 1083 may generate a signal for notifying the occurrence of an event in the electronic device 1000. Examples of events occurring in the electronic device 1000 include call signal reception, message reception, key signal input, and schedule notification. The notification module 1083 may output a notification signal in the form of a video signal via the display 1051, a notification signal in the form of an audio signal via the audio 1052, and a notification signal in the form of a vibration signal via the vibration motor 1053.

Block diagrams of the electronic devices 100 and 1000 of FIG. 9 may be provided for illustration of embodiments. Each of the components in the block diagram may be integrated, added, or omitted according to the specification of the electronic device 100 or 1000 that is actually implemented. In otherwords, two or more components may be combined into a single component, or a single component may be split into two or more components when necessary. Functions performed in each block are intended to describe embodiments, and a specific operation or apparatus related to the functions does not limit the scope.

Operation methods of an electronic device according to embodiments may be implemented in the form of program instructions executable by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tape, optical media such as compact disk ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also high-level language code executable by a computer using an interpreter or the like.

In addition, operation methods of an electronic device according to embodiments may be included in a computer program product when provided. The computer program product may be traded, as a commodity, between a seller and a buyer.

The computer program product may include a software program and a computer-readable storage medium having stored therein the software program. For example, the computer program product may include a product (e.g., a downloadable application) in the form of a software program electronically distributed by a manufacturer of an electronic device or through an electronic market (e.g., Google Play Store™ and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where a third device (e.g., a smartphone) is connected to the server or client device through a communication network, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments. Alternatively, two or more of the server, the client device, and the third device may execute the computer program product to perform the methods according to the embodiments in a distributed manner.

For example, the server (e.g., a cloud server, an artificial intelligence (AI) server, or the like) may execute the computer program product stored therein to control the client device connected to the server via a communication network to perform the methods according to the embodiments.

An electronic device according to an embodiment may store, in a memory, compressed vectors and scaling factors obtained by compressing an embedding matrix and process an input word by using the compressed vectors and scaling factors, and thus, an efficiency of an arithmetic operation may be improved and power consumption may be reduced.

While embodiments have been particularly described with reference to the figures, it will be understood by those of ordinary skill in the art that the embodiments of the disclosure are not to be construed as limiting the scope of the disclosure and various changes and modifications in form and details based on the basic concept of the disclosure also fall within the scope as defined by the following claims.

What is claimed is:

1. An electronic device for processing a word by using a language model, the electronic device comprising:
   a first memory configured to operate at a first speed and store a compressed embedding matrix, which includes a plurality of compressed vectors corresponding to a plurality of words, and scaling factors corresponding to the plurality of compressed vectors;
   a second memory configured to operate at a second speed that is faster than the first speed, store a first group of the plurality of compressed vectors identified based on first frequency information of the plurality of compressed vectors, and store a first group of the scaling factors identified based on second frequency information of the scaling factors; and
   a processor configured to obtain a first compressed vector and a first scaling factor corresponding to an input word from the first memory or the second memory and process the obtained first compressed vector and the obtained first scaling factor by using a neural network.

2. The electronic device of claim 1, wherein the first memory is separate from the processor, and the processor comprises the second memory.

3. The electronic device of claim 1, wherein each of the plurality of compressed vectors is provided in a corresponding row of the compressed embedding matrix, and
   wherein a smaller value of an index representing the corresponding row in the compressed embedding matrix corresponds to an increased frequency of a corresponding word.

4. The electronic device of claim 1, wherein a second scaling factor is assigned to k compressed vectors among the plurality of compressed vectors, and a third scaling factor is assigned to m compressed vectors with a lower frequency than the k compressed vectors, wherein k is less than m.

5. The electronic device of claim 1, wherein the processor is further configured to store compressed vectors in the second memory with a frequency greater than or equal to a preset first value based on the first frequency information of the plurality of compressed vectors and store scaling factors in the second memory with a frequency greater than or equal to a preset second value based on the second frequency information of the scaling factors.

6. The electronic device of claim 1, wherein the second memory comprises a first cache memory configured to store the first group of the plurality of compressed vectors and a second cache memory configured to store the first group of the scaling factors, and
   wherein the processor is further configured to:
      identify whether the first compressed vector is stored in the first cache memory;
      based on the first compressed vector not being stored in the first cache memory, read the first compressed vector from the first cache memory;
      based on the first compressed vector being stored in the first cache memory, read the first compressed vector from the first memory;
      identify whether the first scaling factor exists in the second cache memory;
      based on the first scaling factor being stored in the second cache memory, read the first scaling factor from the second cache memory; and
      based on the first scaling factor not being stored in the second cache memory, read the first scaling factor from the first memory.

7. The electronic device of claim 1, wherein the processor is further configured to identify address information of the first scaling factor based on address information of the first compressed vector and obtain the first scaling factor from the first memory or the second memory based on whether the address information of the first scaling factor indicates the first memory or the second memory.

8. The electronic device of claim 1, wherein the processor is further configured to identify the first scaling factor corresponding to the first compressed vector based on mapping information indicating a mapping relationship between the plurality of compressed vectors and the scaling factors.

9. The electronic device of claim 1, further comprising an input interface configured to receive the input word.

10. The electronic device of claim 1, wherein the processor is further configured to obtain a result value based on data output from the neural network, and
    wherein the electronic device further comprises an output interface configured to output the obtained result value.

11. An operation method of an electronic device for processing a word by using a language model, the operation method comprising:

storing, in a first memory configured to operate and a first speed, a compressed embedding matrix including a plurality of compressed vectors respectively corresponding to a plurality of words and scaling factors corresponding to the plurality of compressed vectors;

storing, in a second memory configured to operate at a second speed that is faster than the first speed, a first group of the plurality of compressed vectors identified based on first frequency information of the plurality of compressed vectors;

storing, in the second memory, a first group of the scaling factors identified based on second frequency information of the scaling factors;

obtaining, from the first memory or the second memory, a first compressed vector and a first scaling factor corresponding to an input word; and processing the obtained first compressed vector and the obtained first scaling factor by using a neural network.

12. The operation method of claim 11, wherein the first memory is separate from a processor of the electronic device that is configured to process the word, and the processor comprises the second memory.

13. The operation method of claim 11, wherein each of the plurality of compressed vectors is provided in a corresponding row of the compressed embedding matrix, and wherein a smaller value of an index representing the corresponding row in the compressed embedding matrix corresponds to an increased frequency of a corresponding word.

14. The operation method of claim 11, wherein a second scaling factor is assigned to k compressed vectors among the plurality of compressed vectors, and a third scaling factor is assigned to m compressed vectors with a lower frequency than the k compressed vectors, wherein k is less than m.

15. The operation method of claim 11, wherein the storing of the first group of the plurality of compressed vectors and the first group of the scaling factors in the second memory comprises storing, in the second memory, compressed vectors with a frequency greater than or equal to a preset first value based on the first frequency information of the plurality of compressed vectors and storing, in the second memory, scaling factors with a frequency greater than or equal to a preset second value based on the second frequency information of the scaling factors.

16. The operation method of claim 11, wherein the second memory comprises a first cache memory configured to store the first group of the plurality of compressed vectors and a second cache memory configured to store the first group of the scaling factors, and wherein the obtaining of the first compressed vector and the first scaling factor from the first memory or the second memory comprises:

identifying whether the first compressed vector is stored in the first cache memory;

based on the first compressed vector being stored in the first cache memory, reading the first compressed vector from the first cache memory;

based on the first compressed vector not being stored in the first cache memory, reading the first compressed vector from the first memory;

identifying whether the first scaling factor is stored in the second cache memory;

based on the first scaling factor being stored in the second cache memory, reading the first scaling factor from the second cache memory; and based on the first scaling factor not being stored in the second cache memory, reading the first scaling factor from the first memory.

17. The operation method of claim 11, wherein the obtaining of the first compressed vector and the first scaling factor from the first memory or the second memory comprises:

identifying address information of the first scaling factor based on address information of the first compressed vector; and obtaining the first scaling factor from the first memory or the second memory based on whether the address information of the first scaling factor indicates the first memory or the second memory.

18. The operation method of claim 11, wherein the obtaining of the first compressed vector and the first scaling factor from the first memory or the second memory comprises identifying the first scaling factor corresponding to the first compressed vector based on mapping information indicating a mapping relationship between the plurality of compressed vectors and the scaling factors.

19. The operation method of claim 11, further comprising:

obtaining a result value based on data output from the neural network; and outputting the obtained result value.

20. One or more non-transitory computer-readable recording media having stored therein a program for controlling an electronic device to perform a method, the method comprising:

storing, in a first memory configured to operate and a first speed, a compressed embedding matrix including a plurality of compressed vectors respectively corresponding to a plurality of words and scaling factors corresponding to the plurality of compressed vectors;

storing, in a second memory configured to operate at a second speed that is faster than the first speed, a first group of the plurality of compressed vectors identified based on first frequency information of the plurality of compressed vectors;

storing, in the second memory, a first group of the scaling factors identified based on second frequency information of the scaling factors;

obtaining, from the first memory or the second memory, a first compressed vector and a first scaling factor corresponding to an input word; and processing the obtained first compressed vector and the obtained first scaling factor by using a neural network.

* * * * *